United States Patent
Dubov et al.

(10) Patent No.: US 10,169,610 B2
(45) Date of Patent: *Jan. 1, 2019

(54) DATA PRIVACY EMPLOYING A K-ANONYMITY MODEL WITH PROBABALISTIC MATCH SELF-SCORING

(71) Applicant: International Business Machines Corporation, Armonk, NY (US)

(72) Inventors: Lawrence Dubov, East Windsor, NJ (US); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,289

(22) Filed: Nov. 11, 2016

(65) Prior Publication Data

US 2017/0061159 A1    Mar. 2, 2017

Related U.S. Application Data

(63) Continuation of application No. 14/450,919, filed on Aug. 4, 2014, now Pat. No. 9,576,151.

(51) Int. Cl.
*G06F 21/62* (2013.01)
*G06F 17/30* (2006.01)
(Continued)

(52) U.S. Cl.
CPC ...... *G06F 21/6254* (2013.01); *G06F 17/3053* (2013.01); *G06F 21/6227* (2013.01);
(Continued)

(58) Field of Classification Search
CPC .. G06F 21/6254; G06F 17/3053; G06N 7/005
(Continued)

(56) References Cited

U.S. PATENT DOCUMENTS

| 8,332,366 B2 | 12/2012 | Schumacher et al. |
| 8,407,246 B2 | 3/2013 | Bezzi |
| 2009/0150362 A1 | 6/2009 | Evenhaim |
| 2010/0332537 A1 | 12/2010 | El Emam et al. |

(Continued)

FOREIGN PATENT DOCUMENTS

EP    2551803 A1    1/2013

OTHER PUBLICATIONS

Anonymous, "Master Data Completeness Process Driven by Self-Score Completeness Metric", IP.com, IPCOM000222456D, Oct. 9, 2012, 3 pages.
L. Sweeney, "k-anonymity: a model for protecting privacy". International Journal on Uncertainty, Fuzziness and Knowledge-based Systems, 10 (5), 2002; pp. 557-570.

(Continued)

*Primary Examiner* — Harunur Rashid
(74) *Attorney, Agent, or Firm* — Robert Bunker; Edell, Shapiro & Finnan, LLC

(57) ABSTRACT

According to one embodiment of the present invention, a system for protecting data determines a desired duplication rate based on a level of desired anonymity for the data and generates a threshold for data records within the data based on the desired duplication rate. The system produces a data record score for each data record based on comparisons of attributes for that data record, compares the data record scores to the threshold, and controls access to the data records based on the comparison. Embodiments of the present invention further include a method and computer program product for protecting data in substantially the same manners described above.

14 Claims, 2 Drawing Sheets

(51) Int. Cl.
*G06N 7/00* (2006.01)
*H04L 29/06* (2006.01)

(52) U.S. Cl.
CPC ......... *G06N 7/005* (2013.01); *H04L 63/0407* (2013.01); *H04L 63/102* (2013.01)

(58) Field of Classification Search
USPC ....................................................... 726/27
See application file for complete search history.

(56) References Cited

U.S. PATENT DOCUMENTS

| | | | |
|---|---|---|---|
| 2011/0178943 A1 | 7/2011 | Motahari et al. | |
| 2014/0237620 A1 | 8/2014 | Ukil et al. | |
| 2015/0067883 A1* | 3/2015 | Shen ..................... | G06Q 50/01 726/27 |

OTHER PUBLICATIONS

Aggarwal et al., "Approximation Algorithm for K-Anonymity" Journal of Privacy Technology, Nov. 20, 2005, 18 pages.

MedCalc Software bvba, "ROC curve analysis in MedCalc", http://www.medcalc.org/manual/roc-curves.php, Jul. 26, 2014.

Initiate Systems, Inc. "Introduction", "False-Positive Rate (Auto-Link Threshold)", Publicly available on Apr. 2, 2009; memorandum, 3 pages.

Lodha et al., "Probabilistic Anonymity", PinKDD (International workshop on privacy security and trust in KDD) workshop with KDD 2007. (Knowledge Discovery and Data Mining) 2007, 12 pages.

Narayanan et al., "Robust De-anonymization of Large Datasets (How to Break Anonymity of the Netflix Prize Dataset)", arXiv:cs/0610105v2, Nov. 22, 2007, 24 pages.

Eltabakh et al., "Query Processing with K-Anonymity", International Journal of Data Engineering, vol. 3: Issue 2, 2012, 14 pages.

Li et al., "On the Tradeoff Between Privacy and Utility in Data Publishing", Jun. 2009; KDD '09 Proceedings of the 15th ACM SIGKDD international conference on Knowledge discovery and data mining; ACM NY, USA; ISBN: 978-1-60558-495-9; pp. 517-525.

List of IBM Patents or Patent Applications Treated as Related, Nov. 11, 2016.

* cited by examiner

DATA PRIVACY EMPLOYING A K-ANONYMITY MODEL WITH PROBABALISTIC MATCH SELF-SCORING

CROSS-REFERENCE TO RELATED APPLICATIONS

This application is a continuation of U.S. patent application Ser. No. 14/450,919, entitled "DATA PRIVACY EMPLOYING A K-ANONYMITY MODEL WITH PROBABALISTIC MATCH SELF-SCORING" and filed Aug. 4, 2014, the disclosure of which is incorporated herein by reference in its entirety.

BACKGROUND

Present invention embodiments relate to information and data management, and more specifically, to data privacy protection using a k-anonymity model with probabilistic match self-scoring.

Data privacy concerns may arise when a data holder wishes to release a version of the data for research. Tools for mining large data samples are capable of joining and searching hundreds of millions or even billions of data records. These tools may be used for applications that require trusted data about customers, clients, patients, guests, citizens, persons of interest, or other parties. When multiple sources of information are joined and intelligently processed, sensitive party information may be inferred and unintentionally disclosed.

One approach to addressing these data privacy concerns is k-anonymity. A data set released by a data holder has k-anonymity protection if the information for each person contained in the released data set cannot be distinguished from at least k−1 individuals whose information also appears in the release. Typically, a data holder anonymizes party data by a removal of explicit identifiers such as name, address and phone number while leaving other demographic information in the released data set. Such a data set can include, for example, the date of birth, gender, and zip code. In this scenario k-anonymity means that each distinct combination of date of birth, gender, and zip code will repeat at least k times in the data set. High values of the parameter k signify higher uncertainty in identification of the individual and therefore provide better privacy protection of the party data. Even if the released data is joined with the data available in the public domain (e.g., voter registration information) a potential data privacy attacker will face an uncertainty in party identification because a single record in the public domain will match at least 1 records in the data released by the data holder. However, there is a tradeoff between keeping the data complete enough to be useful and preserving data privacy.

SUMMARY

According to one embodiment of the present invention, a system for protecting data determines a desired duplication rate based on a level of desired anonymity for the data and generates a threshold for data records within the data based on the desired duplication rate. The system produces a data record score for each data record based on comparisons of attributes for that data record, compares the data record scores to the threshold, and controls access to the data records based on the comparison. Embodiments of the present invention further include a method and computer program product for protecting data in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
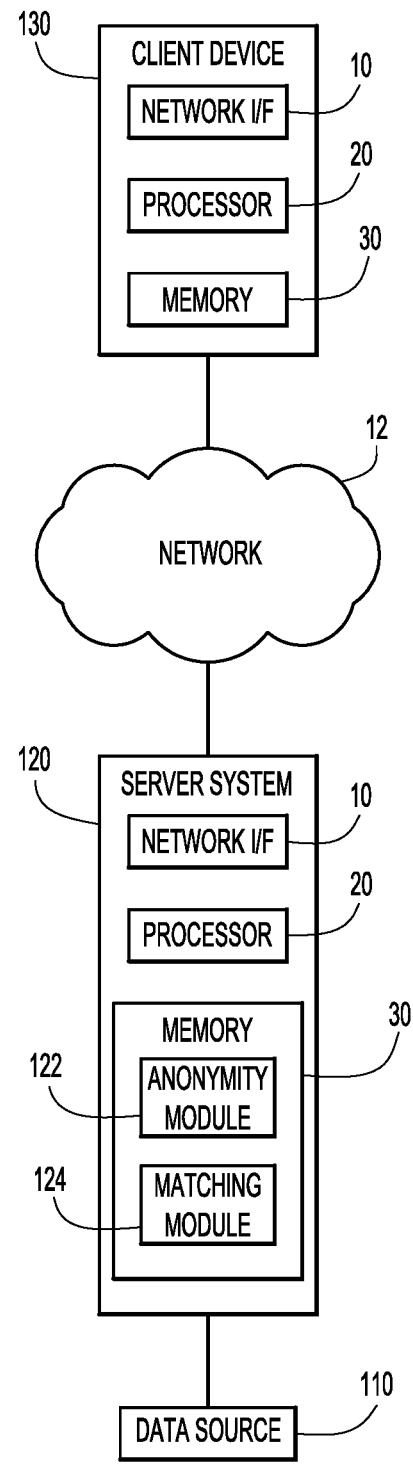
FIG. 1 is a diagrammatic illustration of an example environment for an embodiment of the present invention.

Present invention embodiments pertain to protecting data anonymity using probabilistic techniques. In an example scenario, a health care organization may wish to publicly release a subset of its patient records for research while protecting the patients' identities. The organization may initially exclude record attributes that narrowly identify patients (e.g., social security numbers, phone numbers, etc.) and include broader attributes (e.g., data of birth, zip code, gender, etc.). The attributes to be included in a released record are sometimes referred to as the record's quasi-identifier.

According to one embodiment of the present invention, probabilistic or fuzzy matching techniques for computing a score quantifying the similarity between two data records may be used to compute a self-score for each record intended for release. A self-score is the score for a record compared against itself. A record's self-score is based on its quasi-identifier and may exclude de-identified attributes (e.g., attributes that are included in the released record but masked out, replaced with random values, or the like). Consider a scoring algorithm for which higher scores for a pair of records indicate that the two records are more similar than lower scores do (in an alternative embodiment low scores may indicate similar records). Lower self-scores will then indicate that a record is less distinguishable from other records. As a result, the self-score of a record may operate as a measure of the data privacy protection for that record. In particular, lower self-score values correspond to stronger data protection for a given record when that record is matched against information available in the public domain. For example, if the self-score is near or below a threshold value characteristic of pairs of records considered unlikely to be duplicates, no public domain record can be confidently linked to the released records. In particular, a self-score may be associated with an expected number of falsely matching records in the dataset, corresponding to the k−1 false matches of the k-anonymity approach.

One aspect of a present invention embodiment is a realistic evaluation of the privacy protection (e.g., the k-anonymity or the corresponding expected false positive rate) for a dataset. Probabilistic matching provides a privacy protection model capable of properly processing misspelled values, synonyms, historical changes, data placed in incorrect columns, phonetic similarities, anonymous/masked/de-identified values, differently formatted values, and the like. Ignoring these possibilities tends to underestimate the actual strength of data privacy protection. Even slightly different values that would be deemed identical by a human would not be considered identical by a conventional k-anonymity algorithm based on an exact match comparison. Similarly, exact matching does not account for synonyms such as the word "one" and the numeral "1." Since the probabilistic matching algorithm correctly interprets similarities and dissimilarities in the data to be released, it provides a better tradeoff between privacy protection and usefulness of the released data.

Another aspect of a present invention embodiment is to account for duplicate entity records. In reality there is always a probability that two or more records in a dataset correspond to the same entity (e.g., the same person, organization, etc.) which may result in an overestimate of the effective data privacy protection.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.).

A data source 110 may be implemented by any conventional information storage system (e.g., relational database, file system server, etc.).

A server system 120 may include an anonymity module 122 and matching module 124. The anonymity module and matching module may be implemented across plural server systems. Alternatively, the anonymity module and/or matching module may reside on a client system 130 or other computer system in communication with the client system. The anonymity module and matching module may be separate, or one may be contained within the other.

Client systems 130 enable users to communicate with the anonymity module (e.g., via network 12) and/or access released datasets. The client systems may present any graphical user (e.g., GUI, etc.) or other interface (e.g., command line prompts, menu screens, etc.) to receive commands from users and interact with the anonymity module and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software (e.g., index software, database software, etc.)).

The server system, client system, anonymity module, and/or matching module may include one or more modules or units (e.g., matching weight generation module, ROC curve generation module, etc.) to perform the various functions of present invention embodiments described below (e.g., removing duplicates, determining self-score thresholds, etc.), may be implemented by any combination of any quantity of software and/or hardware modules or units, and may reside within memory 30 of a server system and/or client systems for execution by processor 20.

Figure 2:
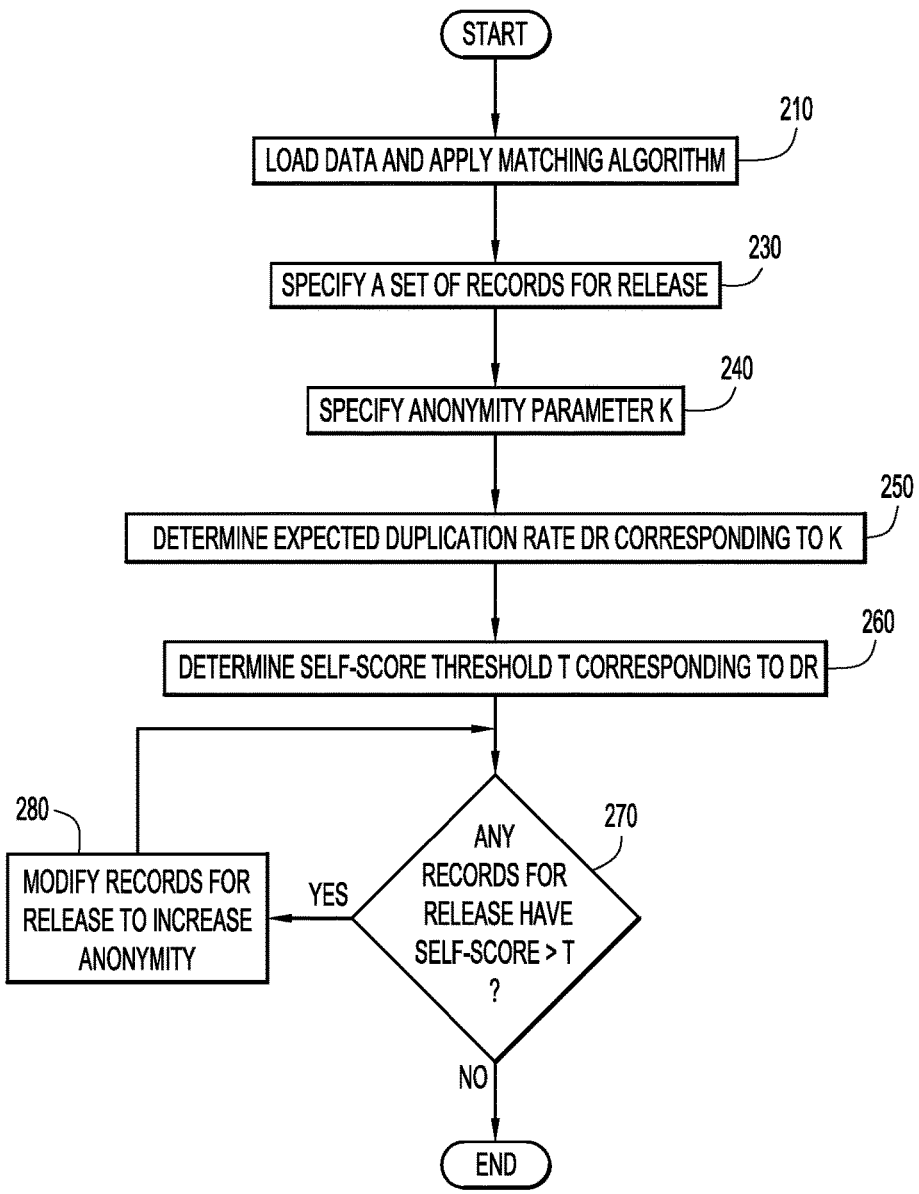
FIG. 2 is a flow diagram illustrating an example manner of protecting data anonymity according to an embodiment of the present invention.

An example manner of protecting data anonymity (e.g., via anonymity module 122, matching module 124, and server system 120) according to an embodiment of the present invention is illustrated in FIG. 2. Initially, data from one or more data sources 110 may be processed by matching module 124 to form a base dataset at step 210. The matching module may use a matching algorithm to identify and merge or link records from one or more data sources that refer to the same entity (e.g., the same patient treated at two health service provides) to form the base dataset. The matching module may use the matching algorithm to identify and remove duplicate records.

The matching algorithm may operate on a pair of records r1 and r2 to compute a score s(r1, r2) that quantifies the similarity of r1 and r2. Any matching algorithm may be used to compute the score. For example, the score s(r1, r2) may have a value of one if each attribute of r1 and r2 exactly match and zero otherwise. Alternatively, a probabilistic or fuzzy algorithm may be used. For example, the algorithm may compute a distance (e.g., the Levenshtein edit distance) for each attribute between the r1 and r2 values for that attribute. The score s(r1, r2) may be set to a logarithm of the likelihood ratio M/U given the computed distances. M is the likelihood function for records that belong to the same entity (e.g., the same person), and U is the likelihood function for records that belong to different entities. The distributions M and U may be estimated from the data. For example, M and U may be modeled as the products of the marginal frequency distributions of distances between attribute value pairs for matching and non-matching records, respectively. To measure the marginal distributions for U, pairs of values of a given attribute for matching records may be selected by matching the records based on similarity of the records' other attributes to avoid biasing the distribution. To measure the marginal distributions for M, pairs of values for non-matching records may be selected randomly.

The matching module may construct a receiver operating characteristic (ROC) curve for threshold matching scores. The ROC curve is a plot of true positive rate against false positive rate for different threshold values of the matching score. In this context, the true positive rate for a given threshold is the probability that a pair of distinct records pertaining to the same entity has a matching score greater than the threshold, and the false positive rate is the probability that two records that pertain to different entities will have a score greater than the threshold. The true and false positive rates may be determined, e.g., from the measured M and U distributions, respectively; by bootstrap sampling from matched and unmatched records, respectively; or by any other conventional or unconventional technique. The information from the ROC curve may be used, e.g., to determine a threshold score for matching records given a desired false positive or false negative rate.

The matching module may be implemented using the algorithms and systems described in U.S. Pat. No. 8,332,366, which is hereby incorporated by reference in its entirety, or any other custom or commercial matching technology (e.g., IBM® Master Data Management (MDM), IBM® QualityStage®, Informatica® MDM, Tibco® Matching Engine, Oracle® Data Quality (ODQ) for Oracle Data Integrator (ODI), Oracle® Healthcare Master Person Index, SAP Data Quality, DataFlux® Data Quality, etc.).

At step 230, a set of data records is specified for release. For example, a data governance organization representing the data holder may specify a dataset to be released internally for development and testing or to a third party. The set of records to be released may comprise some or all records of the base dataset. The records to be released may comprise some or all fields or columns of base dataset records.

At step 240, a level of protection is specified for the data to be released. For example, the data governance organization (or other user) may specify the value of a k-anonymity parameter K which indicates a quantity of K−1 other records with the same attributes to provide anonymity. This value may be used to compute a corresponding desired duplication rate at step 250. The desired duplication rate is given by (1−1/K)×100%. In terms of the k-anonymity model, a value K=2 means that a potential data privacy attacker attempting to match a publically available voter registration record to the released data set would, on average, have to pick one record out of the two matching records in the dataset. This yields 50% desired duplication rate on average. Similarly, if K=10, the rate of duplication will be 90% because only one guess out of 10 will result in a successful privacy attack.

At step 260, the anonymity module determines a self-score threshold T that corresponds to the expected desired duplication rate determined at step 250. The threshold T may be calculated in a manner similar to the calculation of a matching threshold from ROC curve information. For example, in an embodiment in which the score is the logarithm of the likelihood ratio given the computed distance between the records (e.g., $s(r1,r2)=\log(M/U)$), the self-score threshold T may be set to $\log(num/(10+9K))$, where num is the number of data records in the set of data records to be released. For attributes that are the same in data to be released and in data used to match records pertaining to the same entity in step 210, attribute frequencies and/or other derived information may be reused. For attributes that differ in the data to be released, the matching module may derive or re-derive the frequency information used to compute false positive rates or other ROC information.

At step 270, the anonymity module determines whether any of the records to be released have a self-score greater than the threshold T. If not, then all of the specified data records satisfy the k-anonymity requirements and may be released and processing ends. Otherwise, processing proceeds to step 280.

Data records that have a self-score greater than the threshold T, fail the anonymity test and are handled at step 280. In one embodiment of the present invention, failing records are removed from the set of records to be released. According to another embodiment of the present invention, one or more attributes of the failing records are excluded from the records to be released. According to yet another embodiment, one or more attributes of the failing records are modified to be less specific. For example, instead of a date of birth, the records may provide only the year of birth or a range of possible ages. The anonymity module may remove or modify records or fields automatically. Alternatively, the anonymity module may prompt an operator to review the failing records and select records to exclude or modify. Processing then returns to step 270 to determine whether any of the records to be released fail the anonymity test after the changes at step 280.

It will be appreciated that the embodiments described above and illustrated in the drawings represent only a few of the many ways of implementing embodiments for protecting data.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The sources may be implemented by any number of any conventional or other databases, data stores or storage structures (e.g., files, databases, data structures, data or other repositories, etc.) to store information. The sources may be included within or coupled to the server and/or client systems. The sources and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for protecting data of any type (e.g., health records, client records, customer records, product records, etc.) represented in any form (e.g., relational database tables, master data management entity records, custom formats, etc.) using any master data management (MDM) systems or other systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of protecting data comprising:
   determining a desired duplication rate for a data set based on a level of desired anonymity for the data in the data set, wherein one or more attributes of data records within the data set that individually identify an identity for a corresponding data record are de-identified, and remaining attributes of the data records include quasi-identifiers;
   generating a self-score threshold for the data records within the data set based on the desired duplication rate and Receiver Operating Characteristic (ROC) curves;
   producing a data record self-score for each data record in the data set by comparing quasi-identifiers for that data record to quasi-identifiers of a corresponding original data record;
   comparing the data record self-scores to the self-score threshold; and
   controlling access to the data records of the data set based on the data record self-scores satisfying the self-score threshold, wherein controlling access further comprises:
      modifying attributes of data records failing to satisfy the self-score threshold to be less specific; and
      enabling access to data records in response to the data record self-scores satisfying the self-score threshold indicating a presence of the desired level of anonymity for the data records.

2. The computer-implemented method of claim 1, wherein the desired level of anonymity for the data records occurs when data record self-scores are less than or equal to the self-score threshold.

3. The computer-implemented method of claim 1, wherein controlling access to the data records includes:
   modifying one or more attributes of data records lacking the desired level of anonymity to provide the desired level of anonymity for those data records.

4. The computer-implemented method of claim 3, wherein a lack of the desired level of anonymity for the data records occurs when data record self-scores are greater than the self-score threshold.

5. The computer-implemented method of claim 1, wherein:
   a matching function compares a first data record with a second data record to compute a matching score corresponding to a ratio of a first value to a second value, wherein the first value represents a likelihood that the first data record and the second data record both relate to a same entity, and the second value represents a likelihood that the first data record and the second data record relate to different entities; and
   the data record self-score for a data record is the result of applying the matching function to compare the data record to the corresponding original data record.

6. The computer-implemented method of claim 5, wherein:
   the matching score is a logarithm of the ratio;
   the desired duplication rate is $(1-1/K)$, where K is an anonymity parameter; and
   the self-score threshold is a logarithm of $N/(10+9K)$, where N is the number of data records within the data set.

7. A system for protecting data comprising:
   at least one processor configured to:
      determine a desired duplication rate for a data set based on a level of desired anonymity for the data in the data set, wherein one or more attributes of data records within the data set that individually identify an identity for a corresponding data record are de-identified, and remaining attributes of the data records include quasi-identifiers;
      generate a self-score threshold for the data records within the data set based on the desired duplication rate and Receiver Operating Characteristic (ROC) curves;
      produce a data record self-score for each data record in the data set by comparing quasi-identifiers for that data record to quasi-identifiers of a corresponding original data record;

compare the data record self-scores to the self-score threshold; and control access to the data records of the data set based on the data record self-scores satisfying the self-score threshold, wherein controlling access further comprises:

modifying attributes of data records failing to satisfy the self-score threshold to be less specific; and enabling access to data records in response to the data record self-scores satisfying the self-score threshold indicating a presence of the desired level of anonymity for the data records.

8. The system of claim 7, wherein the desired level of anonymity for the data records occurs when data record self-scores are less than or equal to the self-score threshold.

9. The system of claim 7, wherein controlling access to the data records includes:

modifying one or more attributes of data records lacking the desired level of anonymity to provide the desired level of anonymity for those data records.

10. The system of claim 9, wherein a lack of the desired level of anonymity for the data records occurs when data record self-scores are greater than the self-score threshold.

11. A computer program product for protecting data comprising:

a computer readable storage medium having computer readable program code embodied therewith for execution on a processing system, the computer readable program code comprising computer readable program code configured to:

determine a desired duplication rate for a data set based on a level of desired anonymity for the data in the data set, wherein one or more attributes of data records within the data set that individually identify an identity for a corresponding data record are de-identified, and remaining attributes of the data records include quasi-identifiers;

generate a self-score threshold for the data records within the data set based on the desired duplication rate and Receiver Operating Characteristic (ROC) curves;

produce a data record self-score for each data record in the data set by comparing quasi-identifiers for that data record to quasi-identifiers of a corresponding original data record;

compare the data record self-scores to the self-score threshold; and control access to the data records of the data set based on the data record self-scores satisfying the self-score threshold, wherein controlling access further comprises:

modifying attributes of data records failing to satisfy the self-score threshold to be less specific; and enabling access to data records in response to the data record self-scores satisfying the self-score threshold indicating a presence of the desired level of anonymity for the data records.

12. The computer program product of claim 11, wherein the desired level of anonymity for the data records occurs when data record self-scores are less than or equal to the self-score threshold.

13. The computer program product of claim 11, wherein controlling access to the data records includes:

modifying one or more attributes of data records lacking the desired level of anonymity to provide the desired level of anonymity for those data records.

14. The computer program product of claim 13, wherein a lack of the desired level of anonymity for the data records occurs when data record self-scores are greater than the self-score threshold.

* * * * *